UNITED STATES PATENT OFFICE.

JOSEPH B. MURRAY, OF BROOKLYN, NEW YORK.

PROCESS FOR THE REFINING OF METALS.

1,295,568. Specification of Letters Patent. Patented Feb. 25, 1919.

No Drawing. Application filed August 3, 1918. Serial No. 248,149.

*To all whom it may concern:*

Be it known that I, JOSEPH B. MURRAY, a citizen of the United States, residing at Brooklyn, in the county of Kings and State of New York, have invented a certain new and useful Improvement in Processes for the Refining of Metals, of which the following is a specification.

The invention is a process for the refining of metals.

It is well known that when a body of metal, such as iron or steel, is heated from atmospheric temperature to a welding temperature, the structure changes at a certain critical temperature, the grains becoming coarser and the mass harder and more brittle. If the metal, during the heating, is worked or subjected to pressure, then this result is in a measure counteracted. I have discovered that if after the welding heat has been attained, the metal be allowed to cool while the working or pressure is continued, the following results take place. If the pressure be discontinued before the metal has cooled down to the aforesaid critical temperature, the grains will again enlarge and will continue so to do progressively for a period representing the difference between the temperature at the moment of removing the pressure and said critical temperature, so that the beneficial effect of the combined heating and working is in a greater or less degree neutralized. But if, on the other hand, the working or pressure be not stopped until after the metal in cooling has passed the critical temperature, then not only are the said beneficial effects retained, but the metal has even a finer grain, closer structure and greater ductility than it possessed before treatment. In other words, the process of heating the metal to a welding temperature and then cooling the same, while continuing the working or pressure during both the heating and the cooling and until after the critical temperature has been passed during the cooling, refines the metal.

As the temperature of change of the structure of the metal during heating may range between certain limits and is not confined to some precise thermometric degree, it is to be understood that the term "critical temperature," as herein set forth, includes not only a single precise degree, but all degrees between said certain limits, and that, in the latter instance, cooling below the critical temperature means cooling below the lower limit.

Thus, to illustrate: The critical points in steel vary, as is well known, with the carbon contained therein. In low carbon steels, for example, containing .10% carbon, three thermo critical radiations will be detected from 850° to 700°. In this case the term "critical point" as used by me means the lower critical point noted, or 700°. In non-ferros metals which have but one critical temperature, then, of course, that critical temperature is the one to which I herein refer, but in the alloys, where there may be more than one critical temperature, then the lower critical temperature is the one to which I herein refer.

I claim:

The method of refining metal, which consists in heating said metal to a welding temperature while subjecting said metal to pressure, and then removing the source of heat and allowing said metal to cool, while maintaining said compression until after the critical temperature of structural change hereinbefore set forth has been passed.

In testimony whereof I have affixed my signature in presence of two witnesses.

JOSEPH B. MURRAY.

Witnesses:
GERTRUDE T. PORTER,
MAY T. MCGARRY.